(12) United States Patent
Maes

(10) Patent No.: US 8,631,069 B2
(45) Date of Patent: Jan. 14, 2014

(54) WEB AND MULTI-MEDIA CONFERENCE

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1167 days.

(21) Appl. No.: 11/680,712

(22) Filed: Mar. 1, 2007

(65) Prior Publication Data

US 2008/0212499 A1 Sep. 4, 2008

(51) Int. Cl.
*G06F 15/16* (2006.01)

(52) U.S. Cl.
USPC .......................................... 709/204; 709/203

(58) Field of Classification Search
USPC .......................................... 709/203, 204, 206
See application file for complete search history.

(56) References Cited

U.S. PATENT DOCUMENTS

| | | | |
|---|---|---|---|
| 7,372,840 B2 | 5/2008 | Le et al. | |
| 7,404,001 B2* | 7/2008 | Campbell et al. | 709/231 |
| 7,590,692 B2* | 9/2009 | Van Dyke et al. | 709/206 |
| 7,656,866 B2* | 2/2010 | Banner et al. | 370/356 |
| 2002/0095599 A1 | 7/2002 | Hong et al. | |
| 2002/0103898 A1 | 8/2002 | Moyer et al. | |
| 2003/0105520 A1* | 6/2003 | Alferness et al. | 623/2.36 |
| 2003/0145054 A1* | 7/2003 | Dyke | 709/205 |
| 2004/0196867 A1* | 10/2004 | Ejzak et al. | 370/468 |
| 2005/0050209 A1 | 3/2005 | Main, II | |
| 2005/0060368 A1* | 3/2005 | Wang et al. | 709/204 |
| 2005/0097222 A1 | 5/2005 | Jiang et al. | |
| 2005/0111382 A1 | 5/2005 | Le et al. | |
| 2005/0198180 A1 | 9/2005 | Khanolkar et al. | |
| 2005/0198359 A1 | 9/2005 | Basani et al. | |
| 2006/0025156 A1 | 2/2006 | Campbell | |
| 2006/0075483 A1 | 4/2006 | Oberle et al. | |
| 2006/0083242 A1 | 4/2006 | Pulkkinen | |
| 2006/0098577 A1 | 5/2006 | MeLampy et al. | |
| 2006/0098625 A1 | 5/2006 | King et al. | |
| 2006/0146792 A1 | 7/2006 | Ramachandran et al. | |
| 2006/0153354 A1 | 7/2006 | Brahm et al. | |
| 2007/0016484 A1 | 1/2007 | Waters et al. | |
| 2007/0106724 A1* | 5/2007 | Gorti et al. | 709/204 |
| 2007/0136422 A1* | 6/2007 | Ohtani et al. | 709/204 |
| 2007/0168422 A1* | 7/2007 | Choe et al. | 709/204 |
| 2007/0186002 A1* | 8/2007 | Campbell et al. | 709/231 |
| 2007/0192410 A1* | 8/2007 | Liversidge et al. | 709/204 |

(Continued)

OTHER PUBLICATIONS

U.S. Appl. No. 11/428,955, filed Jul. 6, 2006, Office Action mailed Aug. 20, 2010, 15 pages.

(Continued)

*Primary Examiner* — Phuoc Nguyen
(74) *Attorney, Agent, or Firm* — Kilpatrick Townsend & Stockton LLP

(57) ABSTRACT

Methods, systems, and machine-readable media are disclosed for providing multi-media conferencing. According to one embodiment, a method for providing a multi-media conference can comprise receiving a request to participate in the conference from a first client via a signaling protocol. For example, the signaling protocol comprises Session Initiation Protocol (SIP) or another signaling protocol. The first client and a media server adapted to support the conference can be invited to join the conference via third-party call control of the signaling protocol. The method can also include assigning a conference identifier to the conference. In such a case, inviting the first client and the media server can comprise sending invitation messages to each of the first client and the media server wherein the invitation messages include the conference identifier.

46 Claims, 12 Drawing Sheets

(56) References Cited

U.S. PATENT DOCUMENTS

2007/0274504 A1 11/2007 Maes
2007/0276907 A1 11/2007 Maes
2008/0165782 A1 7/2008 Vizaei
2009/0052435 A1 2/2009 Nakamura et al.

OTHER PUBLICATIONS

U.S. Appl. No. 11/383,024, filed May 12, 2006, Office Action mailed Aug. 26, 2010, 22 pages.
U.S. Appl. No. 11/383,024, filed May 12, 2006, Office Action mailed Sep. 15, 2011, 18 pages.
U.S. Appl. No. 11/428,955, filed Jul. 6, 2006, Office Action mailed Sep. 19, 2011, 12 pages.
U.S. Appl. No. 11/383,024, filed May 12, 2006, Final Office Action mailed May 23, 2012, 18 pages.
U.S. Appl. No. 11/383,024, filed May 12, 2006, Advisory Action mailed Sep. 12, 2012, 3 pages.
U.S. Appl. No. 11/428,955, filed Jul. 6, 2006, Office Action mailed Aug. 21, 2012, 16 pages.
U.S. Appl. No. 11/428,955, filed Jul. 6, 2006, Final Office Action mailed Jan. 10, 2012, 11 pages.
U.S. Appl. No. 11/428,955, filed Jul. 6, 2006, Advisory Action mailed Mar. 26, 2012, 3 pages.
U.S. Appl. No. 11/383,024, filed May 12, 2006, Final Office Action mailed Feb. 7, 2011, 17 pages.
U.S. Appl. No. 11/428,955, filed Jul. 6, 2006, Final Office Action mailed Feb. 4, 2011, 12 pages.
U.S. Appl. No. 11/383,024, filed May 12, 2006, Advisory Action mailed Apr. 19, 2011, 3 pages.
U.S. Appl. No. 11/428,955, filed Jul. 6, 2006, Advisory Action mailed Apr. 19, 2011, 3 pages.
Understanding SIP, "Today's Hottest Communications Protocol Comes of Age," Ubiquity White Paper, 6 pages, 2006.

* cited by examiner

WEB AND MULTI-MEDIA CONFERENCE

BACKGROUND OF THE INVENTION

Embodiments of the present invention generally relate to the field of electronic communications. More specifically, embodiments of the present invention relate to providing multi-media conferencing.

Web conferencing refers to the ability of multiple users, likely in different locations, to share a document or presentation. Several application have been in use for providing various forms of web conferencing. For example, Webex™ or Oracle Collaboration Suite Web Conference are such one applications which allow users in different physical locations to share documents, communicate with each other, and participate in the same presentation via the Internet.

However, Webex™ and other such applications are proprietary in nature. That is, these applications rely on proprietary communications between clients and between the clients and the servers supporting the presentation. Therefore, the clients participating in the conference must install and utilize client software to support these communications. As a result, the types of devices and or the media or presentation materials that are suitable for use with these applications are limited to those supported by the client software. None of these previous solutions have been based on standardized communications protocols suitable for use with a wide variety of devices and/or media. Hence, there is a need in the art for improved methods and systems for providing multi-media conferencing.

BRIEF SUMMARY OF THE INVENTION

Methods, systems, and machine-readable media are disclosed for providing multi-media conferencing. According to one embodiment, a method for providing a multi-media conference can comprise receiving a request to participate in the conference from a first client via a signaling protocol. For example, the signaling protocol comprises Session Initiation Protocol (SIP) or another signaling protocol. The first client and a media server adapted to support the conference can be invited to join the conference via third-party call control of the signaling protocol. The method can also include assigning a conference identifier to the conference. In such a case, inviting the first client and the media server can comprise sending invitation messages to each of the first client and the media server wherein the invitation messages include the conference identifier.

According to one embodiment, a second client can also be invited to join the conference via the third-party call control of the signaling protocol. Inviting the second client to join the conference can be performed in response to a request by the first client to invite the second client, a request by the second client to join the conference, or a request by the media server to invite the second client.

The method may also include providing floor control of the conference via messages of the signaling protocol. For example, providing floor control can comprise receiving a request from the first client to control the conference. In response to the request from the first client, control of the conference can be granted to the first client. For example, receiving the request from the first client to control the conference can comprise receiving a first message via the signaling protocol indicating an event for requesting the floor. In such a case, granting control of the conference to the first client can comprise sending a second message to the first client and the second client indicating the first client has been granted the floor. In another example, receiving the request from the first client to control the conference can comprise receiving an indication of a first Dual-Tone Multi-Frequency code corresponding to a request for control of the conference via a first message of the signaling protocol. In such a case, granting control of the conference to the first client can comprise sending a second DTMF code to the second client via a second message of the signaling protocol. In yet another example, receiving the request from the first client to control the conference can comprise receiving a first message via the signaling protocol indicating a request for the floor. In such a case, granting control of the conference to the first client can comprise sending a Session Description Protocol (SDP) update to the second client. In still another example, receiving the request from the first client to control the conference can comprise receiving at the media server a first message via the signaling protocol indicating a request for the floor. In such a case, granting control of the conference to the first client can comprise transmitting a packet indicating floor control by the first client as part of Real-time Transport Protocol (RTP) data from the media server.

According to another embodiment, a system for providing a multi-media conference can comprise a communications network and a media server communicatively coupled with the communications network and adapted to support the multi-media conference. The system can also include a first client communicatively coupled with the communications network and adapted to request participation in the multi-media conference via a signaling protocol. An application server can also be communicatively coupled with the communications network. The application server can be adapted to receive the request from the first client and, in response to the request from the first client, send an invitation message of the signaling protocol to the first client and the media server to initiate the conference. For example, the signaling protocol comprises Session Initiation Protocol (SIP) or another signaling protocol. In some cases, the application server can be further adapted to assign a conference identifier to the conference. In such cases, the application server can be adapted to invite the first client and the media server by sending invitation messages to each of the first client and the media server wherein the invitation message includes the conference identifier.

According to one embodiment, the application server can be further adapted to invite a second client to join the conference via the third party call control of the signaling protocol. In such a case, inviting the second client to join the conference can be performed in response to a request by the first client to invite the second client, a request by the second client to join the conference, or a request by the media server to invite the second client.

According to another embodiment, application server can be further adapted to provide floor control of the conference via messages of the signaling protocol. Providing floor control can comprise receiving a request from the first client to control the conference and, in response to the request from the first client, granting control of the conference to the first client. For example, receiving the request from the first client to control the conference can comprise receiving a first message via the signaling protocol indicating an event for requesting the floor. In such a case, granting control of the conference to the first client can comprise sending a second message to the first client and the second client indicating the first client has been granted the floor. In another example, receiving the request from the first client to control the conference can comprise receiving an indication of a first Dual-Tone Multi-Frequency code corresponding to a request for control of the conference via a first message of the signaling protocol. In such a case, granting control of the conference to the first client comprises sending a second DTMF code to the second client via a second message of the signaling protocol. In yet another example, receiving the request from the first client to control the conference can comprise receiving a first message via the signaling protocol indicating a request for the floor. In such cases, granting control of the conference to the first client comprises sending a Session Description Protocol (SDP) update to the second client.

According to one embodiment, the media server can be adapted to perform floor control of the conference. In such a case, the media server can receive a request from the first client to control the conference via a first message of the signaling protocol or as part of the media transport (e.g RTP) indicating a request for the floor and grant control of the conference to the first client by transmitting a packet indicating floor control by the first client as part of Real-time Transport Protocol (RTP) data or as part of the signaling protocol.

According to still another embodiment, a machine-readable medium can have stored thereon a series of instruction which, when executed by a processor, cause the processor to provide a multi-media conference by receiving a request to participate in the conference from a first client via a signaling protocol and inviting the first client and a media server adapted to support the conference to join the conference via third-party call control of the signaling protocol.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

It should be noted that, while discussed herein with reference to Session Initiation Protocol (SIP), embodiments of the present invention are not limited to such implementations. Rather, embodiments of the present invention can be implemented with any of a number of different signaling protocols. While not limited to use with SIP, this protocol demonstrates exemplary characteristics that may be useful in implementing various embodiments of the present invention.

Generally speaking, embodiments of the present invention relate to providing and/or supporting multi-media conferences which may be attended or participated in by any number of clients over a communications network such as the Internet. It should be noted that, as used herein, the term conference is used to refer to any type of electronic conference including but not limited to a voice conference, a video conference, a push-to-talk conference, IM voice chat, web conference, and/or any other conference of multimedia data. According to one embodiment, these conferences can be established and maintained, i.e., controlled, using a standardized signaling protocol such as SIP. That is, the communications between the clients and between the clients and the server or servers supporting the conference can take place via SIP or other signaling protocol. These communications can include those for initiating the conference as well as for controlling the floor, i.e., controlling which participant can manipulate or control a presentation at a particular time.

Figure 1:
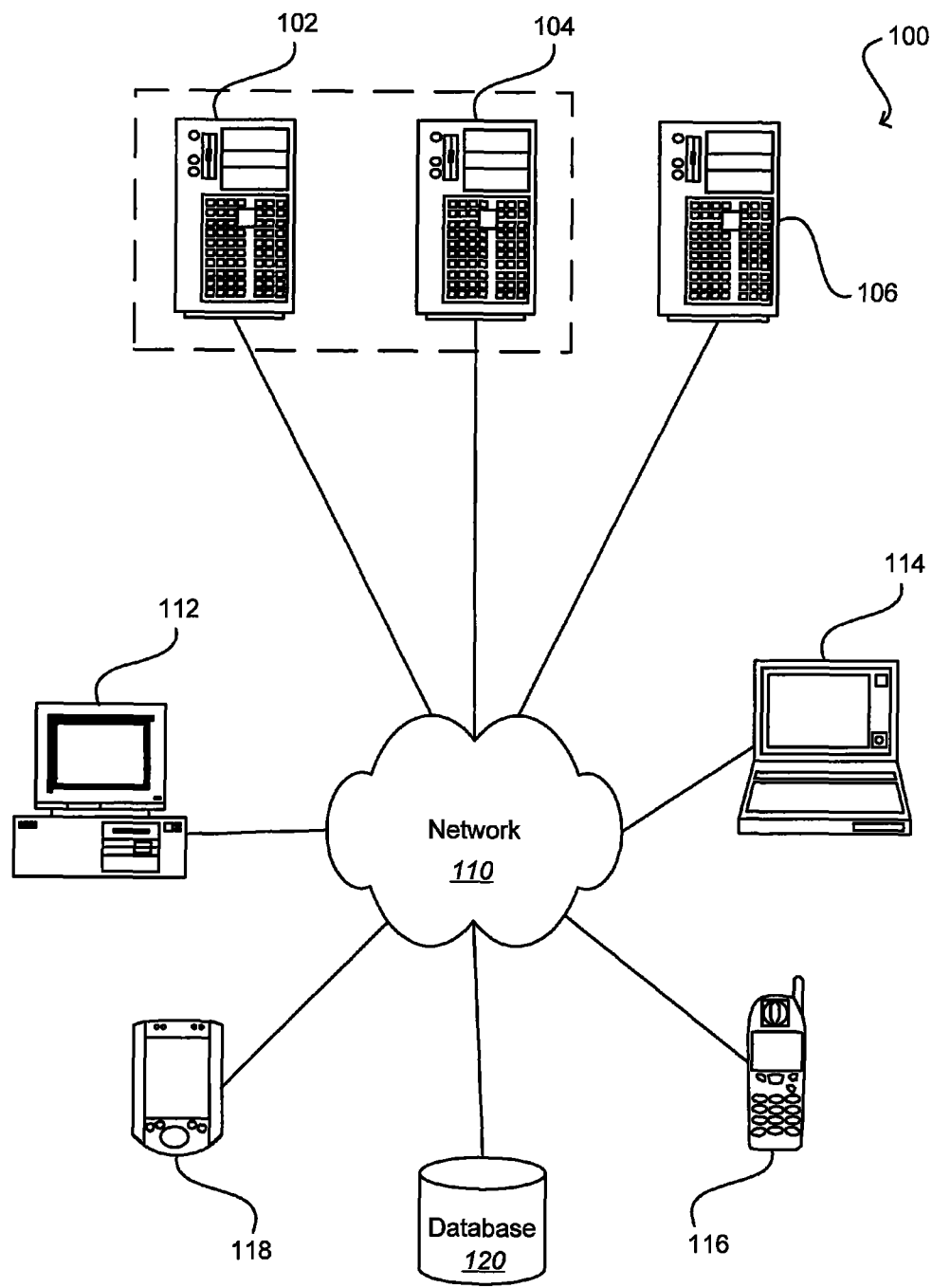
FIG. 1 is a block diagram illustrating an exemplary environment in which various embodiments of the present invention may be implemented.

FIG. 1 is a block diagram illustrating an exemplary environment in which various embodiments of the present invention may be implemented. The system 100 can include one or more user computers, computing devices, or processing devices 112, 114, 116, 118, which can be used to operate a client, such as a dedicated application, web browser, etc. The user computers 112, 114, 116, 118 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 112, 114, 116, 118 may also have any of a variety of applications, including one or more development systems, database client and/or server applications, and Web browser applications. Alternatively, the user computers 112, 114, 116, 118 may be any other electronic device, such as a thin-client computer, Internet-enabled gaming system, and/or personal messaging device, capable of communicating via a network (e.g., the network 110 described below) and/or displaying and navigating Web pages or other types of electronic documents. Although the exemplary system 100 is shown with four user computers, any number of user computers may be supported.

The system 100 can also include a communications network 110. The network may can be any type of network familiar to those skilled in the art that can support data communications using any of a variety of commercially-available protocols, including without limitation TCP/IP, SNA, IPX, AppleTalk, and the like. Merely by way of example, the network 110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 102, 104, 106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 106) may be dedicated to running applications, such as a business application, a Web server, application server, etc. Such servers may be used to process requests from user computers 112, 114, 116, 118. The applications can also include any number of applications for controlling access to resources of the servers 102, 104, 106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 112, 114, 116, 118. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 112, 114, 116, 118.

The system 100 may also include one or more databases 120. The database(s) 120 may reside in a variety of locations. By way of example, a database 120 may reside on a storage medium local to (and/or resident in) one or more of the computers 102, 104, 106, 112, 114, 116, 118. Alternatively, it may be remote from any or all of the computers 102, 104, 106, 112, 114, 116, 118, and/or in communication (e.g., via the network 110) with one or more of these. In a particular set of embodiments, the database 120 may reside in a storage-area network ("SAN") familiar to those skilled in the art. Similarly, any necessary files for performing the functions attributed to the computers 102, 104, 106, 112, 114, 116, 118 may be stored locally on the respective computer and/or remotely, as appropriate. In one set of embodiments, the database 120 may be a relational database, such as Oracle 10g, that is adapted to store, update, and retrieve data in response to SQL-formatted commands.

According to one embodiment, communications between the elements of the system 100 depicted in FIG. 1 can be implemented using a signaling protocol such as SIP. Furthermore, these communications can be routed in accord with the methods and systems of co-pending U.S. patent application Ser. No. 11/383,024 filed on May 12, 2006 and entitled "SIP Routing Customization" which is incorporated herein by reference for all purposes. It should be noted that such systems and methods are not required for implementing various embodiments of the present invention. Rather, such methods and systems are offered by way of example to provided a more thorough understanding of possible implementations of the various embodiments. Furthermore, a portion of the referenced application is reproduced herein for the sake of convenience.

Figure 2:
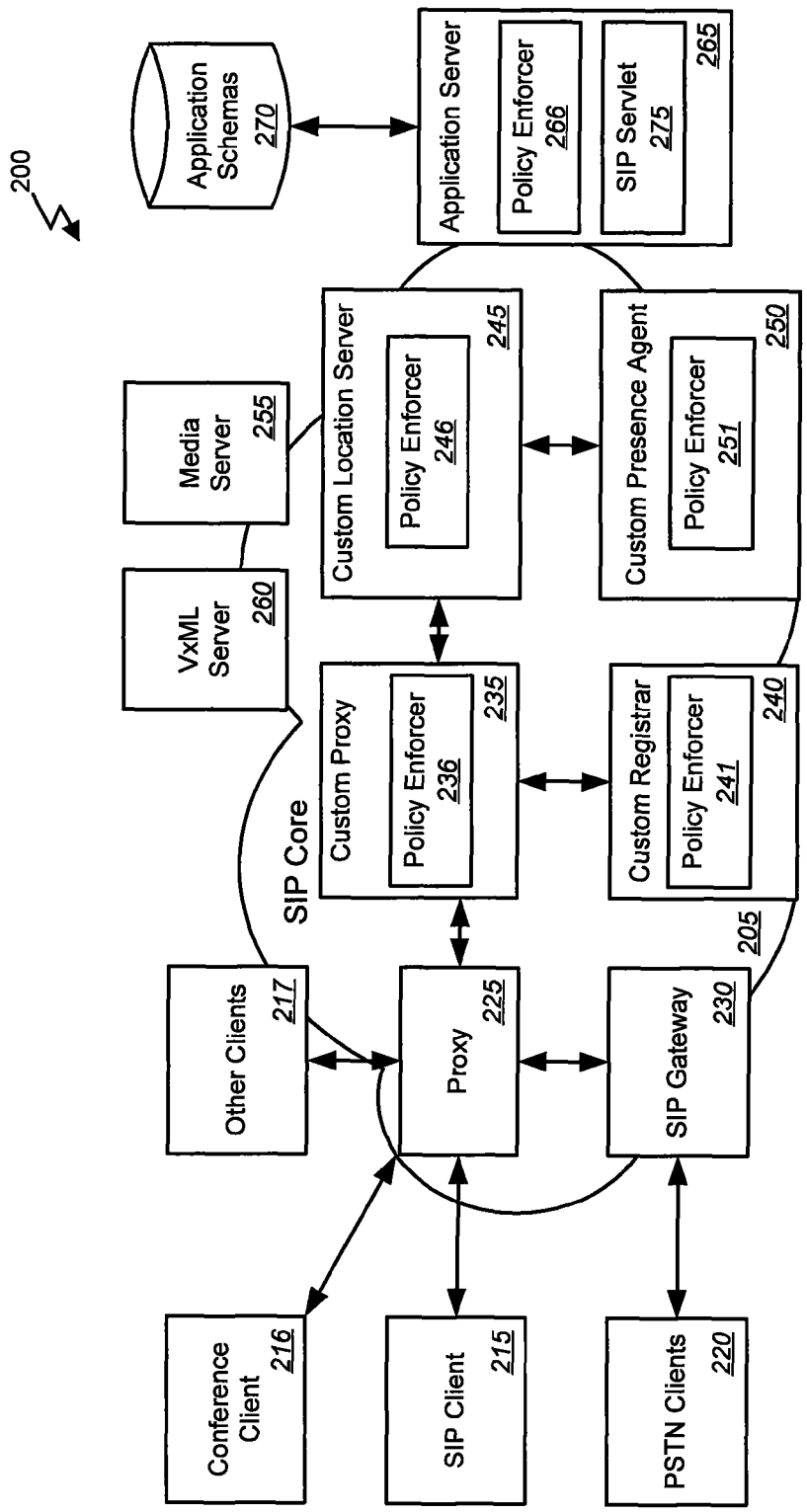
FIG. 2 is a block diagram illustrating functional components of a system for providing a multi-media conference according to one embodiment of the present invention.

FIG. 2 is a block diagram illustrating functional components of a system for providing multi-media conferencing according to one embodiment of the present invention. This example represents, conceptually, components that may be implemented in an environment such as described above with reference to FIG. 1 or any other suitable environment for routing messages based on a set of stored addresses.

In this example, the system 200 includes a SIP core 205 and a number of clients such as SIP clients 215, Public Switched Telephone Network (PTSN) clients 220, etc. The SIP core 205 can provide access to one or more servers 255-265 and/or can route messages or signals between the clients 210-220 and/or the servers 255-265. As is common, the SIP core 205 can receive messages or signals from the clients via a proxy 225 or, as in the case of PSTN clients, via a SIP gateway 230 and the proxy 225.

According to one embodiment, the SIP core 205 can also include a number of customized or modified components such as a custom proxy 235 and a custom location server 245. The system can further comprise a custom registrar 240 adapted to store one or more addresses of record for the endpoints such as client devices, servers etc. However, rather than storing a single target SIP URI as is common with a typical SIP registrar, the custom registrar 240 can be adapted to store multiple target SIP URIs. Additionally or alternatively, the custom registrar 240 may be adapted to store, set, or otherwise modify one or more policies related to the target SIP URIs. According to one embodiment, the components for providing such customization may be implemented in an application server 265. That is, the custom elements, i.e., the custom registrar 240, custom proxy 235, custom location server 245, and custom presence agent 250, can be implemented as one or more applications executing on an application server 265 and available to the SIP core 205.

The custom proxy 235 can be adapted to receive a request, for example via proxy 225, to establish a session with a target device. The customized location server 245 can be adapted to determine, in response to receiving a query from the custom proxy 235, one or more target SIP URIs for the target AOR/device from stored target SIP URIs or policy scripts executed by the custom proxy 235. The customized location server 245 can also be adapted to apply one or more policies to the one or more SIP URIs for the target AOR/device via a policy enforcement module 246. Alternatively or additionally, these policies can be applied by any or all of a policy enforcement module 236 of the custom proxy 235, a policy enforcement module 241 of the custom registrar 240, a policy enforcement module 251 of the custom presence agent, and/or a policy enforcement module 266 of the application server 265. That is, rather than simply returning a discovered target SIP URI, the customized location server 245 can apply policies to the target SIP URI(s) to modify the target SIP URI(s) returned. As will be seen, this provides much greater flexibility and functionality over the standard SIP location server.

The one or more policies applied by the customized location server 245 can comprise a set of one or more conditions and one or more actions associated with each condition. For example, the one or more policies can include one or more conditions based on preferences for a user of the target endpoint, one or more conditions based on calendar information for a user of the target endpoint, one or more conditions based on presence of a user on the target endpoint or another endpoint, one or more conditions based on a user of the target endpoint being authenticated, one or more conditions based on a user of the target endpoint being authorized to receive a message, such as by having paid a fee. In such a case, a check can be performed to determine whether the sender is authorized to send based on having paid a fee, not being blacklisted, being authorized by the target user, etc.

Determining one or more target SIP URIs for the target AOR/endpoint and applying one or more policies to request one or more target SIP URIs for the target AOR/endpoint can be performed by the customized location server 245 while routing the request to establish a session with the target endpoint can be performed by the custom proxy 235 of the SIP system. Policies can be applied when registering at the custom location server 245, when requesting addresses from the custom location server 245, and/or at the custom proxy 235 when scripts or policies are passed from the custom location server 245 in answer to a request. It should be noted that the policies of the latter type can remain on the custom proxy 245 for the duration of a session or for one exchange. For caching purpose, they could stay longer. In some environments, the policies could be cached across sessions and endpoints or even be pre-compiled in the custom proxy 235.

Therefore, when registering, the custom registrar 240 can load information into the custom location server 245. A policy may apply to this information and can result in changing the target SIP URI. Alternatively, the metadata can be associated with the target SIP URI defining policies that are specific to it, if any. This may be based on how, when and who registered, information passed during registration (e.g. via SIP header as a URI), etc.

When an endpoint requests a target SIP URI, such as be issuing a message to another endpoint, the custom location server 245 can return the target SIP URI, a modified target SIP URI, a list of target SIP URIs with a navigation flow (e.g. parallel (e.g. SIP forking), series, . . . ), or a script to run on the custom proxy 235 that can be passed with the target SIP URI (as metadata) or instead of the target SIP URI. Alternatively, if policy enforcement is done in the custom proxy 235, then nothing needs to be passed. As noted above, scripts may includes routing scripts as well as header manipulation instructions as well as any other operation described in the policy. The custom proxy 235 may execute policies that it has locally (e.g., loaded by administrator) or that it has obtained as a script with or instead of target SIP URIs when interrogating the custom location server 245. These policies may apply also on firewall/media gateway—i.e. on the media stream as with a Realtime Transfer Protocol (RTP) programmable/policy based firewall. The firewall may check with the proxy or policy enforcer to determine if a policy applies the media stream between IP addresses and ports that are involved.

When the custom proxy 235 is present for a session, the custom proxy 235 can act as a B2B User Agent or as a third party call control between the endpoints. In the latter case, it acts like a middleman and it behaves for each endpoint as if it was the other endpoint. In this way, all messages come back and forth to the custom proxy 235. As such, the custom proxy 235 updates headers and addresses of the messages appropriately. In the former case header manipulation takes place to ensure that responses pass through.

In some cases, the system 200 may also have a custom presence agent 250 adapted to determine presence of a user on the target endpoint or another endpoint. That is, by monitoring various endpoints and/or messages, the custom presence agent 250 can detect the use of one of the endpoints. Furthermore, the custom presence agent 250 can be adapted to influence application of the one or more policies to the one or more AORs for the target endpoint by the customized location server 245 based on the presence of the user. So, for example, the policy can request to check presence of the user through the custom presence agent 250 and change the target SIP URI(s) returned accordingly. The custom presence agent 250 or presence server can be a user agent that can apply policies on any: subscription, updates or publications. A custom presence agent 250 or presence server can be interrogated with the location server and deal with responses that may be about multiple target SIP URIs or policies themselves to determine presence updates or to run for the particular principal presence. For example, the custom presence agent 250 can determine how to determine what presence attributes to update if the principal uses different devices with different states, when to update based, for example, on preferences, when to use or route other messages (e.g. email, SMS, or others), etc. Alternatively, this endpoint may be considered busy and another target SIP URI may be selected as the first to contact. This can be accomplished by the proxy executing the target SIP URI(s) or script/policy appropriately. That is, the proxy can detect the failed message and issue a new one if prescribed by the target SIP URIs or by the received policy script. It should be noted that the proxy can also act as a SIP forking proxy and act per the policies on messages to allow multiple endpoints to receive invite or other messages and to interact.

The custom proxy 235 can be further adapted to route the request to establish a session with the target device based on results of the customized location server 245 applying the one or more policies to the one or more target SIP URIs for the target device. That is, rather than simply routing to a discovered target SIP URI returned by the location server, the custom proxy can be adapted to deal with multiple target SIP URIs or policy/scripts returned by the custom location server 245. For example, the custom location server 245, after applying policies to the stored target SIP URIs for a particular device may return multiple target SIP URIs to be contacted, perhaps even in a specified order. The custom proxy 235 can be adapted to route messages to each device represented by the target SIP URIs in a manner indicated by the custom location server 245 (e.g. SIP forking or other behaviors).

Therefore, rather than simply returning a stored target SIP URI in response to a signal or message, the custom proxy 235 and customized location server 245, as well as the custom registrar 240 and/or custom presence agent 250 in some cases, provide for the application of one or more policies to the target SIP URIs. As mentioned above, the policies can comprise one or more conditions for each target SIP URIs with one or more rules associated with each condition. Such conditions and rules can take a wide variety of forms to perform any number of different tasks. Some possibilities are now offered by way of example and not limitation.

However, as noted in the application referenced above, the example illustrated in FIG. 2 assumes that the SIP core can be modified to provide such features. In many cases, the SIP core is provided as part of an existing network or network element and cannot be easily modified. Therefore, the alternative embodiment described in "SIP Customized Routing" utilizing a custom domain may alternatively be used to implement various embodiments of the present invention.

Figure 3:
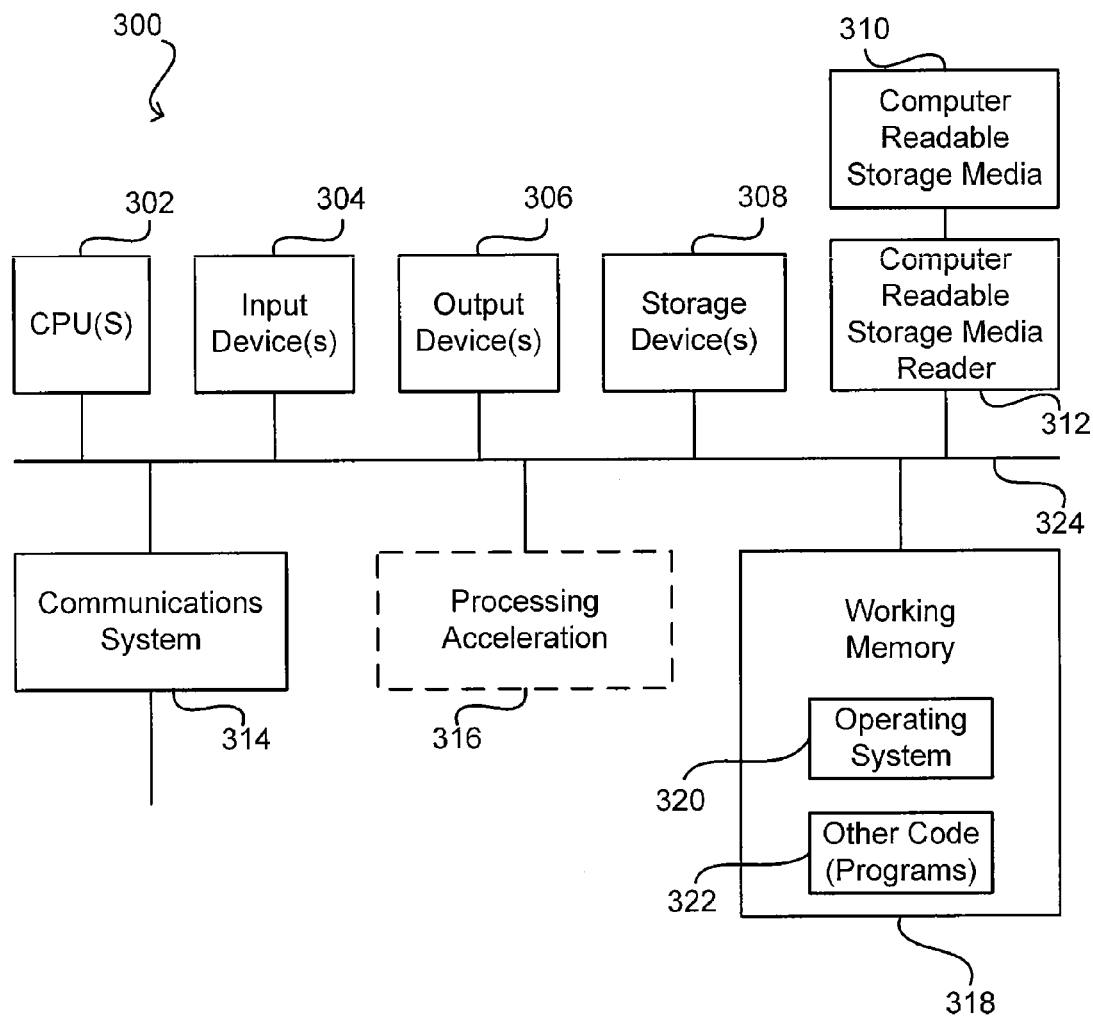
FIG. 3 is a block diagram illustrating an exemplary computer system upon which embodiments of the present invention may be implemented.

FIG. 3 is a block diagram illustrating an exemplary computer system upon which embodiments of the present invention may be implemented. The system 300 may be used to implement any of the computer systems described above. For example, one or more systems such as system 300 may be used to implement a server, user computer, and/or any other of the systems or components described above.

The computer system 300 is shown comprising hardware elements that may be electrically coupled via a bus 324. The hardware elements may include one or more central processing units (CPUs) 302, one or more input devices 304 (e.g., a mouse, a keyboard, etc.), and one or more output devices 306 (e.g., a display device, a printer, etc.). The computer system 300 may also include one or more storage devices 308. By way of example, the storage device(s) 308 can include devices such as disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 312, a communications system 314 (e.g., a modem, a network card (wireless or wired), an infra-red communication device, etc.), and working memory 318, which may include RAM and ROM devices as described above. In some embodiments, the computer system 300 may also include a processing acceleration unit 316, which can include a digital signal processor DSP, a special-purpose processor, and/or the like.

The computer-readable storage media reader 312 can further be connected to a computer-readable storage medium 310, together (and, optionally, in combination with storage device(s) 308) comprehensively representing remote, local, fixed, and/or removable storage devices plus storage media for temporarily and/or more permanently containing computer-readable information. The communications system 314 may permit data to be exchanged with the network and/or any other computer described above with respect to the system 300.

The computer system 300 may also comprise software elements, shown as being currently located within a working memory 318, including an operating system 320 and/or other code 322, such as an application program (which may be a client application, Web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Software stored on and/or executed by system 300 can include instructions for providing a multi-media conference. For example, providing a multi-media conference can comprise receiving a request to participate in the conference from a first client via a signaling protocol such as SIP or another signaling protocol. The first client and a media server adapted to support the conference can be invited to join the conference via third-party call control of the signaling protocol. The method can also include assigning a conference identifier to the conference. In such a case, inviting the first client and the media server can comprise sending invitation messages to each of the first client and the media server wherein the invitation messages include the conference identifier.

Figure 4:
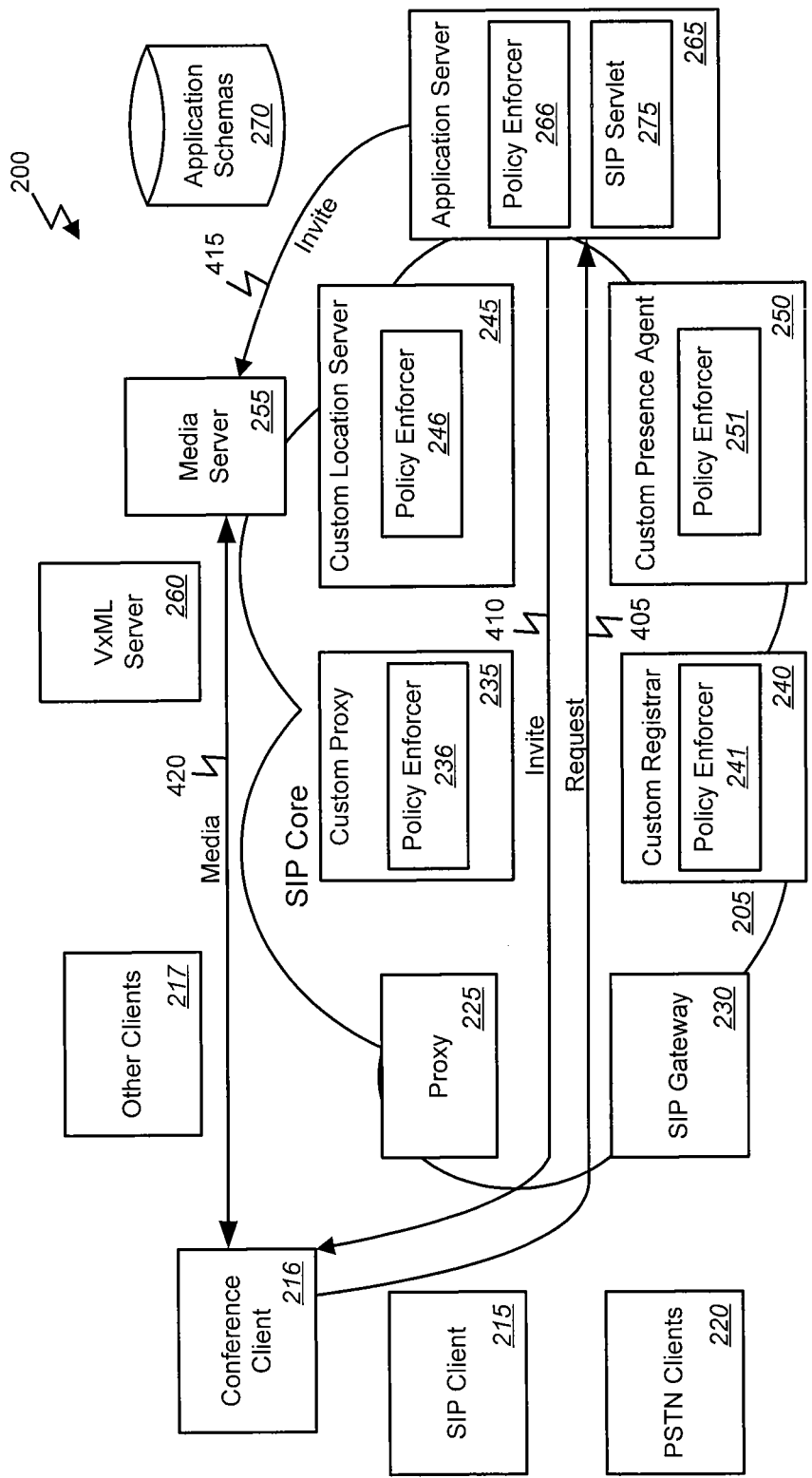
FIG. 4 is a block diagram illustrating a flow of messages between components of the system of FIG. 2 when providing a multi-media conference according to one embodiment of the present invention.

FIG. 4 is a block diagram illustrating a flow of messages between components of the system of FIG. 2 when providing a multi-media conference according to one embodiment of the present invention. In this example, a first client 216 can be communicatively coupled with a communications network such as the Internet or other network as described above for communicating message with other elements of the system 200 according to routing provided by the SIP core 205 also as described above. The client 216 can be adapted to request participation in the multi-media conference via SIP or another signaling protocol. That is, the client 216 can be adapted to initiate and send a message, via the signaling protocol, that represents a request 405 to initiate or join a conference.

An application server 265 can also be communicatively coupled with the communications network and can send and receive messages via the SIP servlet 275 and as routed by the SIP core 205. The application server 265 can be adapted to receive the request 405 from the first client 216 and, in response to the request 405 from the first client 216, send an invitation message 410 and 415 of the signaling protocol, such as, for example, a SIP invite, to the first client 216 and a media server 255 to initiate the conference. That is, the application server 265, in response to a request from the client 216 can in turn send a invitation message to the client 216 and a media server 255 for supporting the conference to join the conference. In some cases, the application server 265 can be further adapted to assign a conference identifier to the conference. In such cases, the application server 265 can be adapted to invite the first client 216 and the media server 255 by sending invitation messages 410 and 415 to each of the first client and the media server wherein the invitation message includes the conference identifier.

Upon acceptance of the invitation messages 410 and 415 by the client 216 and the media server 255, the conference can be initiated and media 420 can be exchanged between the client 216 and the media server 255 and/or any other participants. According to one embodiment, the media may be exchanged using any of a variety of streaming protocols such as, for example, Real-time Transport Protocol (RTP). Furthermore, additional parties may join the conference. For example, as will be discussed below with reference to FIG. 5, another client, such as a SIP client 215 or other, may request to join or be invited to join the conference by a similar exchange of invitation and acceptance messages.

Figure 5:
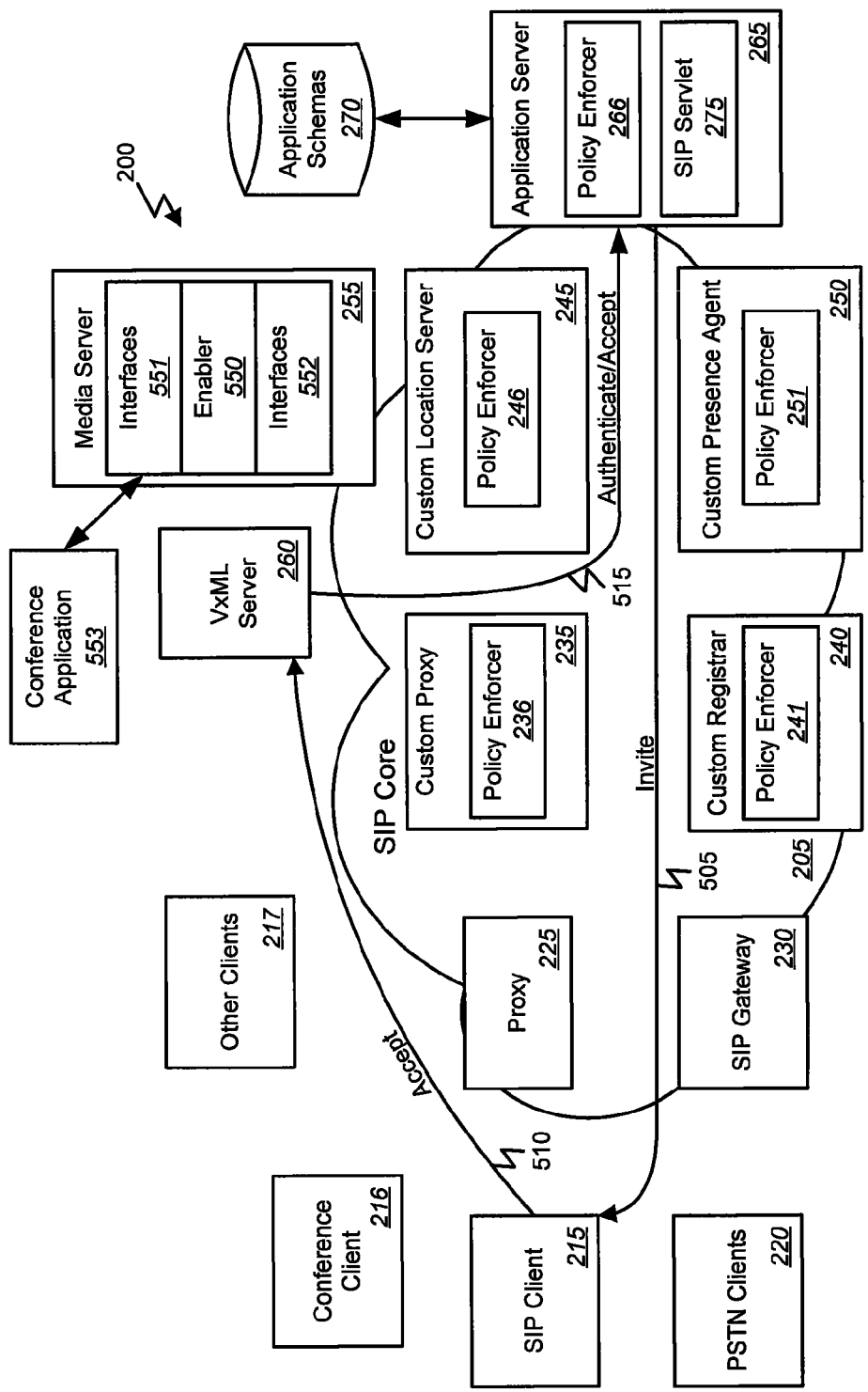
FIG. 5 is a block diagram illustrating a flow of messages between components of the system of FIG. 2 when providing a multi-media conference according to another embodiment of the present invention.

FIG. 5 is a block diagram illustrating a flow of messages between components of the system of FIG. 2 when providing a multi-media conference according to another embodiment of the present invention. According to this embodiment, the application server 265 can be further adapted to invite 505 a second client such as SIP client 215 to join the conference via the third party call control of the signaling protocol. In such a case, inviting the second client 215 to join the conference can be performed in response to a request by the first client 216 to invite the second client 215, a request by the second client 215 to join the conference, or a request by the media server 255 to invite the second client 215.

In response to the invitation message 505 from the application server 265, the second client 215 can send an acceptance message 510. This acceptance message can be returned to the application server 265, the media server 255 or, as illustrated here, may be routed by the SIP core 205 to a Voice XML server 260 or other server for authentication of a user of the second client 215. Upon authentication, the Voice XML server 260 or other server may pass the acceptance message 515 to the application server 265 and/or the media server to allow the second client 215 to join the conference.

According to another embodiment, and as will be described in detail below with reference to FIG. 8, the application server 265 or the media server 255 can be further adapted to provide floor control of the conference via messages of the signaling protocol. That is, the servers 265 and/or 255 can be adapted to determine which of the clients participating in the conference has control of the conference or presentation. As will be seen, control can be maintained in a number of different ways but generally consists of receiving a request to control the floor from one of the clients via a message of the signaling protocol or RTP or other exchanged media and granting that control via another message of the signaling protocol to the participants of the conference.

In another embodiment, instead of the media server 255 being adapted to support the behavior like floor control, the media server 255 may recognize the request message (e.g., in RTP or SIP) and pass the request to an application 553 executed by the media server 255 or another element of the system 200 such as, for example, the application server 265. So, for example, the media server 255 may provide control interfaces 551 and 552 for sending and/or receiving control messages and/or commands. The application 553 can in turn, via media server control interfaces 551 and 552, react to these messages and command other elements of the system 200 to handle the different incoming and outgoing legs (e.g. which one to mute, which to mix etc.).

More specifically, an enabler 550 of the media server 255 can provide streaming media, recorded/stored media, media conversion, conferencing and control, media mixing, VCR functions, and other functions on a set of media. The enabler 550 can also provide, for example, Parlay conferencing. A set of northbound interfaces 551 of such an enabler 550 can provide, for example, Java and/or web service as well as client (SIP, WS, in media, etc) support. Additionally, such an enabler 550 may provide a set of southbound interfaces 552 supporting, for example, Media Sessions Markup Language (MSML), Media Server Control Markup Language (MSCML), Multiple Species Conservation Program (MSCP), MOdeling Markup Language (MOML), Netann, and/or others.

In use, when establishing and/or controlling a conference (or conferences), an application 553 invoked or initiated to control a conference, for example via the northbound interfaces 551 of the media server control enabler 550, can setup and reserve (pre-configure) a conference bridge (e.g. on a media server or on a legacy system) for voice or other media. Such a process can include, for example, assigning an address/number to the conference, receive authorization requests/delegates, accepting participants, receiving notification of participant leaving, freeing resources. In some cases, the application 553 can also predefine mixing setup and instructions, e.g. a DTMF key to ask floor, get floor etc. Additionally or alternatively, the application 553 can perform real time setup of conference with above features. Once the conference is established, the application 553 can perform various functions to affect conference management (PoC, Web Conference, etc.). These functions can include, but are not limited to, receiving floor requests, setting the floor, mute parties, holding parties, set media mixing, streaming and processing: (delivery of streamed media), etc.

The media server control enabler 550 can provide functions including, but not limited to setting of media conversions, settings media mixing settings, setting media streaming, selecting welcome prompts, etc. For example, the enabler 550 may select a welcome VoiceXML page (including recordings) for the conference and control media mixing, streaming and processing during the conference. Additionally or alternatively, the enabler 550 may provide real time VCR functions (e.g. IPTV) such as forward, FF, rewind, FR, pause etc. during the conference.

In summary, the media server 255, for example via a media server control enabler 550 and accompanying interfaces 551 and 552, can receive request and/or messages via SIP or RTP. The media server 255, for example via northbound interfaces 551 of the media server control enabler 550, can initiate or invoke a conference application 553 to control the conference. The conference application 553 can in turn, also via the interfaces 551 and 552 of the enabler 550, instruct the media server 255 what to do with regard to the clients via SIP/RTP if needed.

Figure 6:
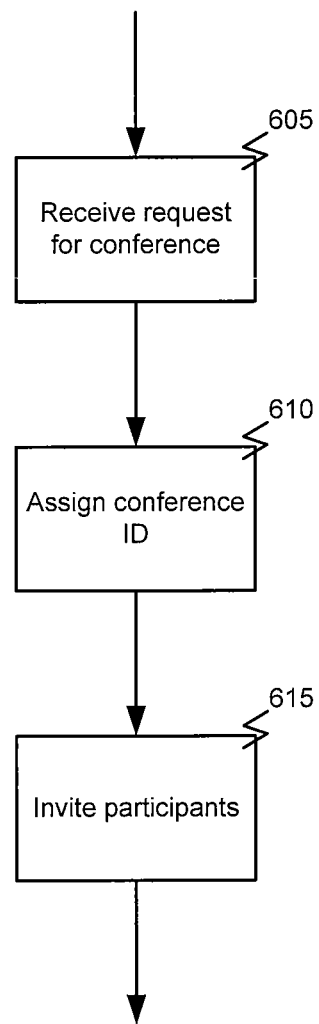
FIG. 6 is a flowchart illustrating a processes for providing a multi-media conference according to one embodiment of the present invention.

FIG. 6 is a flowchart illustrating a processes for providing a multi-media conference according to one embodiment of the present invention. In this example, the process begins with receiving 605 a request to participate in the conference from a first client via a signaling protocol. For example, the signaling protocol comprises Session Initiation Protocol (SIP) or another signaling protocol. A conference identifier can be assigned 610 to the conference. The first client and a media server adapted to support the conference can be invited 615 to join the conference via third-party call control of the signaling protocol. Inviting 615 the first client and the media server can comprise sending invitation messages to each of the first client and the media server wherein the invitation messages include the conference identifier.

According to one embodiment, as noted above a second and/or additional clients can also be invited to join the conference via the third-party call control of the signaling protocol. Inviting the additional clients to join the conference can be performed in response to a request by the first client to invite the second client, a request by the second client to join the conference, or a request by the media server to invite the second client.

Figure 7:
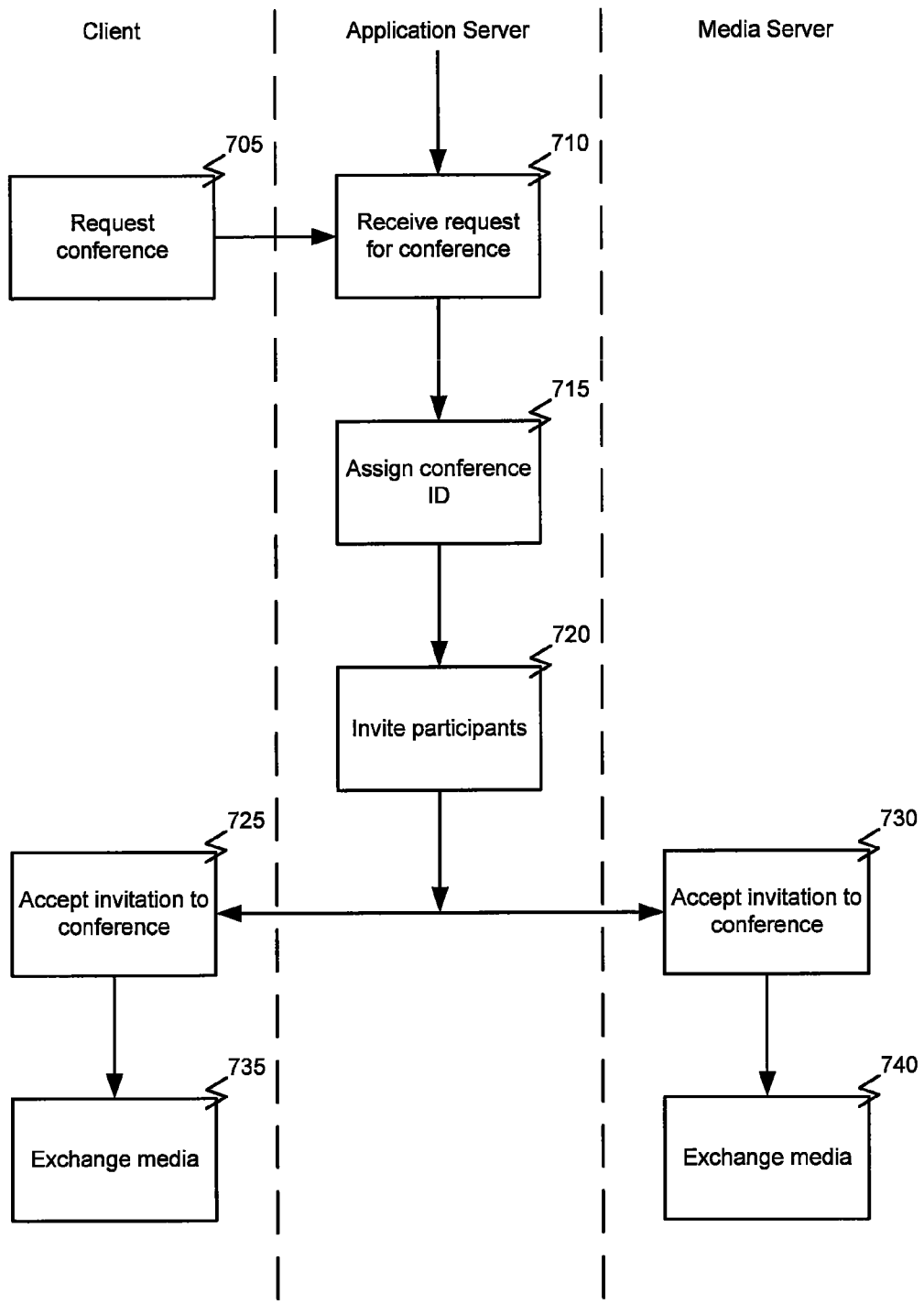
FIG. 7 is a flowchart illustrating additional details of a process for providing a multi-media conference according to one embodiment of the present invention.

FIG. 7 is a flowchart illustrating additional details of a process for providing a multi-media conference according to one embodiment of the present invention. In this example, the process begins with a client requesting 705 to initiate or join a conference via a message of a signaling protocol. An application server can receive 710 the request to participate in the conference from the client via the signaling protocol. For example, the signaling protocol can comprise Session Initiation Protocol (SIP) or another signaling protocol.

The application server can assign 715 a conference identifier to the conference, if a new conference is being initiated. In the case of the client joining an existing conference, rather than assigning a conference number, the application server can determine a number for the conference requested. For example, when requesting to join a conference, the client request may indicate the conference number to be joined.

The client and the media server adapted to support the conference can then be invited 720 to join the conference via third-party call control of the signaling protocol. Additionally, if other parties are to be invited to the conference, as indicated by the client, the application server, the media server, or other clients requesting to join the conference, the other parties can be invited as well. Inviting the first client and the media server can comprise sending invitation messages to each of the client or clients, the media server, and any other parties to the conference. The invitation messages can include the conference identifier.

As noted above, the application server or the media server supporting the conference can also perform floor control, i.e., can control which participant of the conference can present, control the presentation, etc. Generally speaking, floor control may pass from one participant to another in response to a request for the floor from the participant. The request for the floor and acknowledgement of granting of the floor can be passed in a number of ways by messages of the signaling protocol as well as part of the exchanged media (e.g. RTP).

Once a conference is initiated, i.e., once a participant has accepted the invitation to join, a session can be established with specific codecs and/or protocols between the participants. The session can then be used to exchange particular data (e.g. MSRP for IM, Audio, Encoded display (Web conference, Video etc. . . . ). It should be understood that such sessions can be initiated using SIP as illustrated in the example of FIG. 7, using Session Description Protocol (SDP) as will be described below, or with another protocol.

Figure 8:
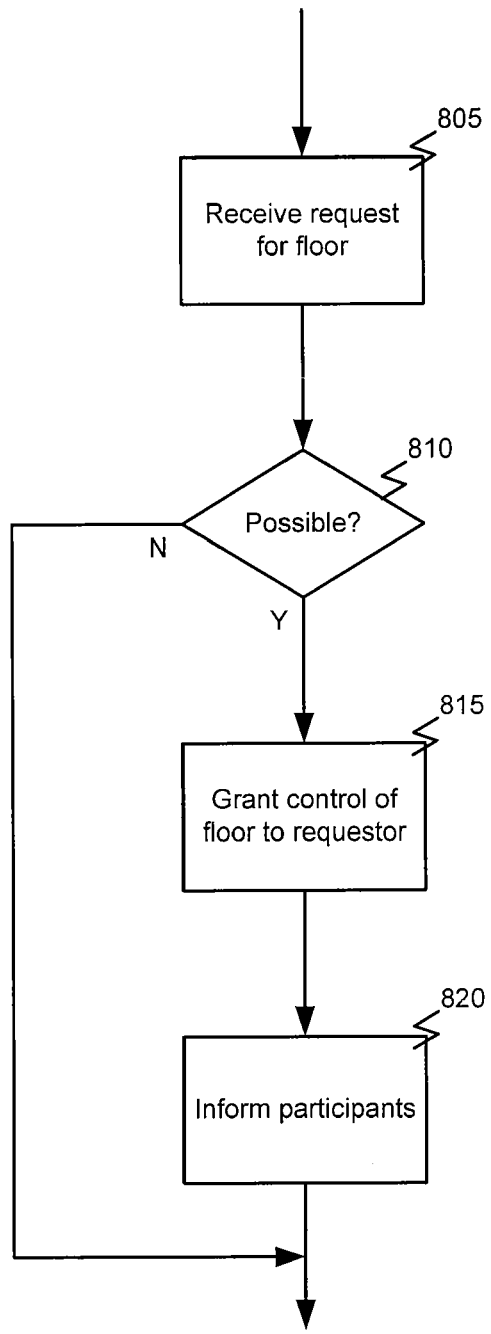
FIG. 8 is a flowchart illustrating a process for floor control of a multi-media conference according to one embodiment of the present invention.

FIG. 8 is a flowchart illustrating a process for floor control of a multi-media conference according to one embodiment of the present invention. In this example, floor control of the conference begins with receiving 805 a request from a client to control the conference. As noted above, the request can be in the form of a message of the signaling protocol. A determination 810 can be made as to whether the requesting client can be granted control. This determination 810 can be based on any of a number of factors such as a status or authority of the requester, the status or authority of the participant currently controlling the floor, the relative status or authority between the requestor and the participant currently controlling the floor, an order in which requests are received, another priority based scheme, etc. In response to the request 805 from the client and determining 810 that the requesting client can be granted the floor, control of the conference can be granted 815 to the client. The participants of the conference can then be informed 820 that control of the floor has now been passed to the requesting client.

As noted above, a request to control the floor and notice of granting the floor can be passed between participants via messages of the signaling protocol. More specifically, these messages can be implemented in a number of different ways. For example, receiving the request from the first client to control the conference can comprise receiving a first message via the signaling protocol indicating an event for requesting the floor. That is, a SIP message can include an indication of a predefined floor control request event. In such a case, granting control of the conference to the first client can comprise sending a second message to the first client and the second client indicating the first client has been granted the floor. In other words, another SIP message can be generated and sent that includes another predefined event indicating granting of the floor to the requestor. In such a case, the recipients can yield control to the requester as in indicated by the message.

In another example, receiving the request from the first client to control the conference can comprise receiving an indication of a first Dual-Tone Multi-Frequency code corresponding to a request for control of the conference via a first message of the signaling protocol. That is, a message, such as a SIP message can include indications of DTMF codes. One code, for example *1, can be predetermined to indicate a request for the floor. In such a case, granting control of the conference to the first client can comprise sending a second DTMF code to the second client via a second message of the signaling protocol. In other words, another DTMF code, for example *2 can be sent to the participants other than the requestor to place them on mute, thus giving the floor to the requester.

In yet another example, receiving the request from the first client to control the conference can comprise receiving a first message via the signaling protocol indicating a request for the floor. In such a case, granting control of the conference to the first client can comprise sending a Session Description Protocol (SDP) update to the second client. That is, a message including an SDP update can be sent to participants other than the one that has control of the floor in which the SDP update indicates a non-negotiable codec. In effect, this can in turn cause those participants to be placed on mute or hold.

In still another example, receiving the request from the first client to control the conference can comprise receiving at the media server a first message via the signaling protocol indicating a request for the floor. In such a case, granting control of the conference to the first client can comprise transmitting a packet indicating floor control by the first client as part of Real-time Transport Protocol (RTP) data from the media server. Request for client can go to the media server. According to one embodiment, the media server can be pre programmed to process and react accordingly upon receiving the request from the client. Alternatively, the media server may pass recognized request through any API/message to the conference application that can process it and use $3^{rd}$ party CC to act on the media server and affect clients or can interact with the media server to tell it to do something (e.g. mute some lines). It can be passed as part of bursts or DTMF or other messages in the RTP/media.

It should be noted that, embodiments of the present invention may be implemented in existing communications or conferencing systems. For example, embodiments of the present invention may be implemented in a SIP communications infrastructure of network to provide conferencing between SIP clients and/or other SIP enabled endpoints.

Figure 9:
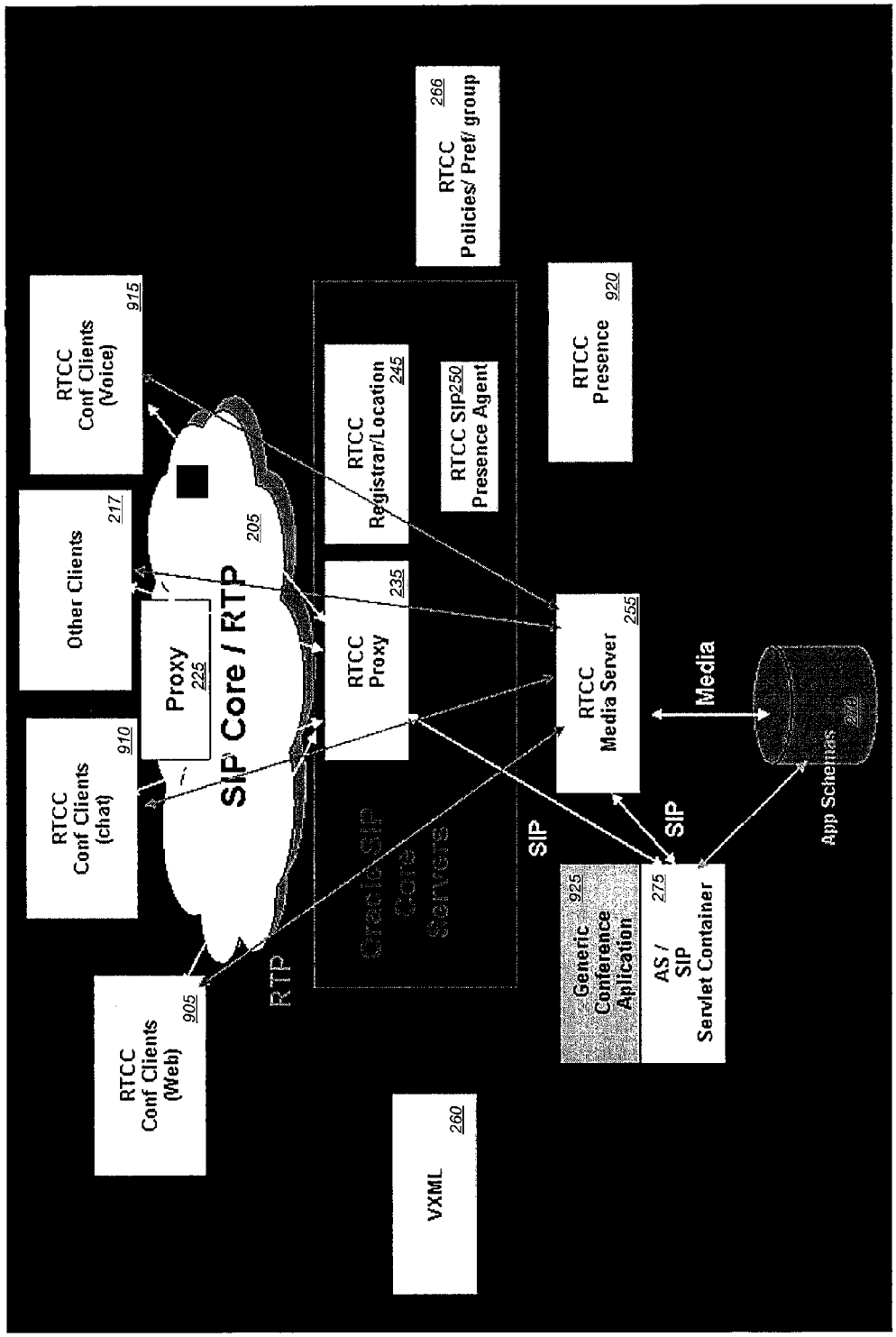
FIG. 9 is a block diagram illustrating integration of conference services with a SIP infrastructure according to one embodiment of the present invention.

FIG. 9 is a block diagram illustrating integration of conference services with a SIP infrastructure according to one embodiment of the present invention. This example illustrates a system similar to and including components described above with reference to FIG. 2. For example, the system can include a SIP core 205 and a number of clients such as Real-Time Call Control (RTCC) web conference clients 905, RTCC chat conference clients 910, RTCC voice conference clients 915, and other clients 217. The system may also include a policies enforcer 266 and an additional presence server such as RTCC presence server 920.

The SIP core 205 can also include proxies 225 and 235 and a location server 245 such as described above. The system can further comprise a registrar 240 adapted to store one or more addresses of record for the endpoints such as client devices, servers etc. and presence agent 250. Also as described above, the SIP core 205 can provide access to one or more servers such as the media server 255 and possibly a voice XML server 260 and/or can route messages or signals between the clients 210-220 and/or the servers 255 and 260 and other elements of the system.

According to one embodiment, a SIP servlet 925 may be implemented upon which a conference application 275 can be executed. The conference application 925, via the SIP servlet 275 can communicate with the media serve 255, the proxy 236, and other components using SIP. Thus, as described above, the clients can send and the conference application can receive a request to participate in the conference via a signaling protocol, i.e., SIP. The requesting client and the media server adapted to support the conference can be invited to join the conference via third-party call control of the signaling protocol, i.e., RTCC.

The media server 255 can comprise a SIP end point that performs generic media processing that can include, but is not limited to real time media conversion, real time media mixing, real time media streaming, etc. Vendors may provide call control and voice/dialog/DTMF management but these are logically outside the media server realm.

Additionally or alternatively, the media server can provide codec conversions for appropriate clients, real-time control for different client capabilities and for each media type, which may be negotiated, for example, via SDP; for archive and/or playback of content stored as a multimedia presentation (e.g. MPEG4, Flash), codec switches and/or re-negotiations based on bandwidth, etc. The media server may provide a clock and/or time stamps across medias to provide for synchronization of media on clients, synchronization of multimedia presentations stored in archives for playback, real time media overlays, etc. Additionally or alternatively, the media server can provide conference management functions including but not limited to manage of users (mute, presenter, etc) based on controls received from conference application, floor control, interworking with a system that uses floor control, etc.

In another embodiment, instead of the media server being adapted to support the behavior like floor control, the media server may recognize the request message (e.g., in RTP or SIP) and pass the request to an application executed by the media server or another element of the system such as, for example, the application server. So, for example, the media server may provide control interfaces for sending and/or receiving control messages and/or commands. The application can in turn, via media server control interfaces, react to these messages and command other elements of the system to handle the different incoming and outgoing legs (e.g. which one to mute, which to mix etc.).

More specifically, an enabler of the media server can provide streaming media, recorded/stored media, media conversion, conferencing and control, media mixing, VCR functions, and other functions on a set of media. A set of northbound interfaces of such an enabler can provide, for example, Java and/or web service as well as client (SIP, WS, in media, etc) support. Additionally, such an enabler may provide a set of southbound interfaces supporting, for example, Media Sessions Markup Language (MSML), Media Server Control Markup Language (MSCML), Multiple Species Conservation Program (MSCP), MOdeling Markup Language (MOML), Netann, and/or others.

In use, when establishing and/or controlling a conference (or conferences), an application invoked or initiated to control a conference, for example via the northbound interfaces of the media server control enabler, can setup and reserve (pre-configure) a conference bridge (e.g. on a media server or on a legacy system) for voice or other media. Such a process can include, for example, assigning an address/number to the conference, receive authorization requests/delegates, accepting participants, receiving notification of participant leaving, freeing resources. In some cases, the application can also predefine mixing setup and instructions, e.g. a DTMF key to ask floor, get floor etc. Additionally or alternatively, the application can perform real time setup of conference with above features. Once the conference is established, the application can perform various functions to affect conference management (PoC, Web Conference, etc.). These functions can include, but are not limited to, receiving floor requests, setting the floor, mute parties, holding parties, set media mixing, streaming and processing: (delivery of streamed media), etc.

The media server control enabler can provide functions including, but not limited to setting of media conversions, settings media mixing settings, setting media streaming, selecting welcome prompts, etc. For example, the enabler may select a welcome VoiceXML page (including recordings) for the conference and control media mixing, streaming and processing during the conference. Additionally or alternatively, the enabler may provide real time VCR functions (e.g. IPTV) such as forward, FF, rewind, FR, pause etc. during the conference.

In summary, the media server, for example via a media server control enabler and accompanying interfaces, can receive request and/or messages via SIP or RTP. The media server, for example via northbound interfaces of the media server control enabler, can initiate or invoke a conference application to control the conference. The conference application can in turn, also via the interfaces of the enabler, instruct the media server what to do with regard to the clients via SIP/RTP if needed.

Figure 10:
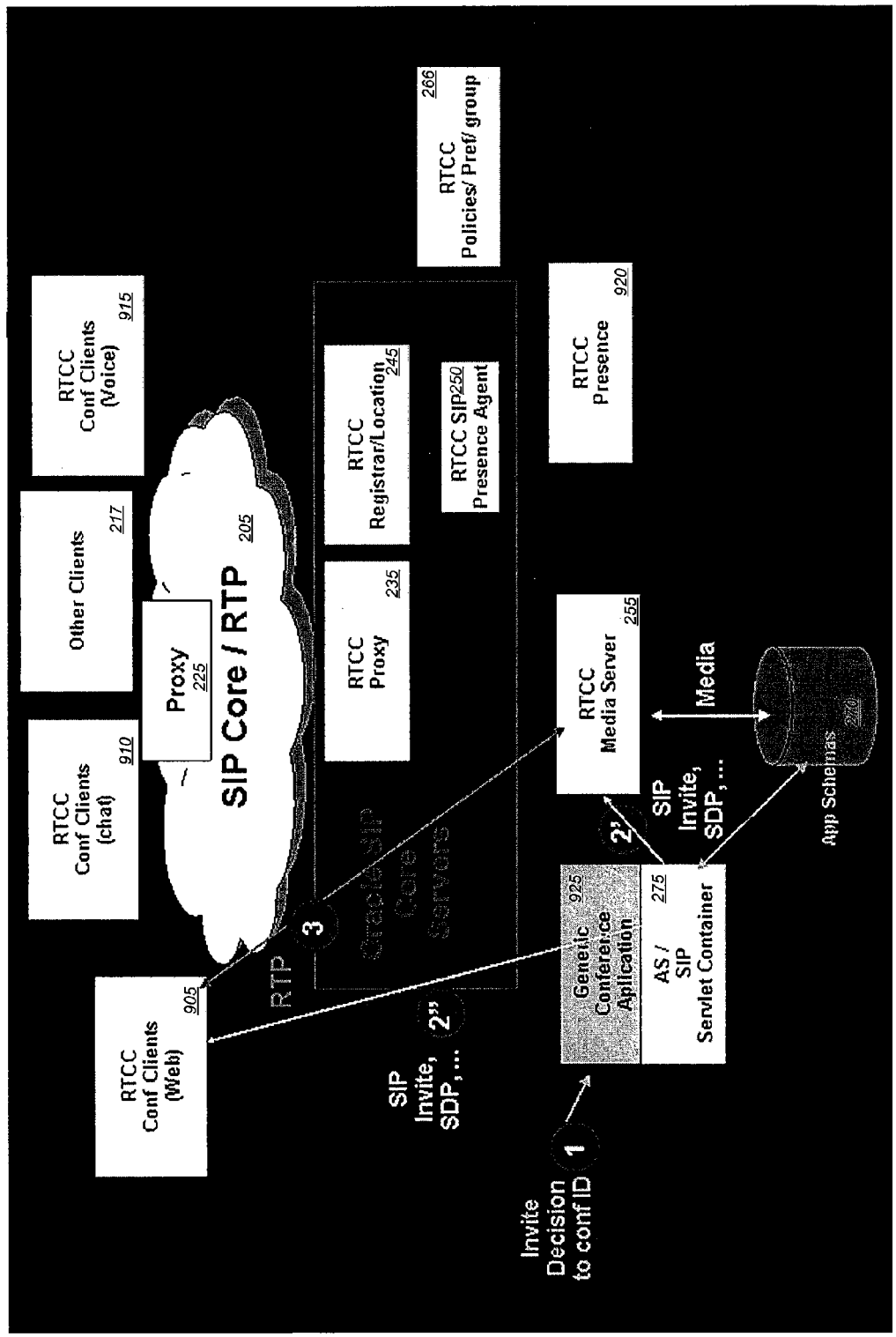
FIG. 10 is a block diagram illustrating invitation of a client to join a conference according to one embodiment of the present invention.

FIG. 10 is a block diagram illustrating invitation of a client to join a conference according to one embodiment of the present invention. More specifically, this example illustrates a SIP based infrastructure for supporting a web conference such as described above and invitation of a web conference client. Similar to the example described above with reference to FIG. 4, a client such as the web conference client 905 can be communicatively coupled with a communications network such as the Internet or other network as described above for communicating message with other elements of the system according to routing provided by the SIP core 205 also as described above. The SIP servlet 275, at the request of the conference application 925, can be adapted to invite participation in the multi-media conference by the web conference client 905. That is, the client 905 can be adapted to initiate and send a SIP INVITE or other message, via the signaling protocol, to the web conference client 905 that represents an invitation to join a conference.

The SIP servlet 275 can also be adapted to send an invitation message of the signaling protocol, such as, for example, a SIP invite, to the media server 255 to invite the media server 255 to participate in the conference. Upon acceptance of the invitation messages by the client 905 and the media server 255, the conference can be initiated and media can be exchanged between the client 905 and the media server 255 and/or any other participants. According to one embodiment, the media may be exchanged using any of a variety of streaming protocols such as, for example, Real-time Transport Protocol (RTP). Furthermore, additional parties may join the conference. Other transports can include, but are not limited to Stream Control Transmission Protocol (SCTP), Internet Protocol Detail Records (IPDR), Retransmission Payload Format (RTP), and others.

Figure 11A:
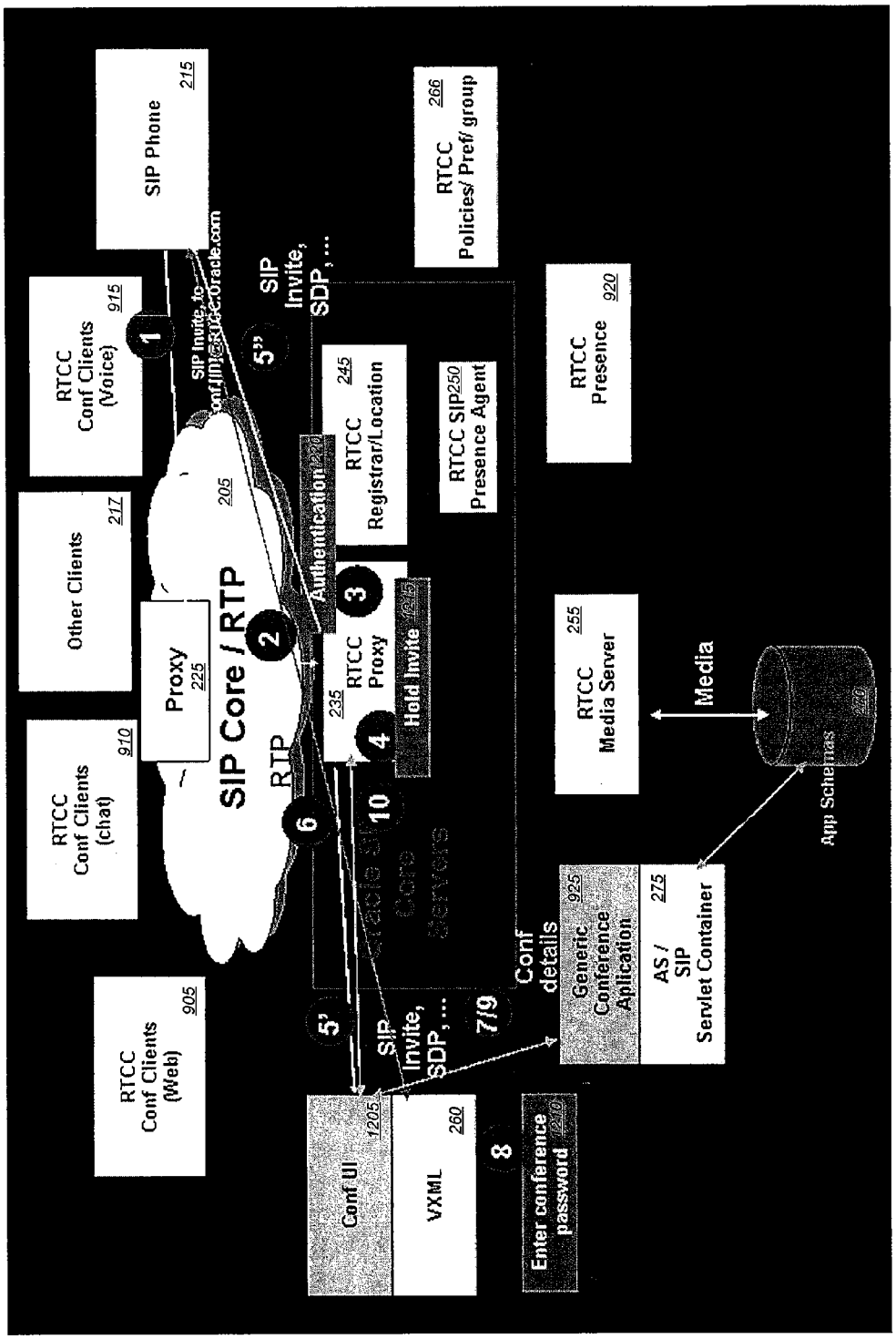
FIGS. 11A and 11B are a block diagrams illustrating adding a VoIP SIP phone to a conference according to one embodiment of the present invention.
Figure 11B:
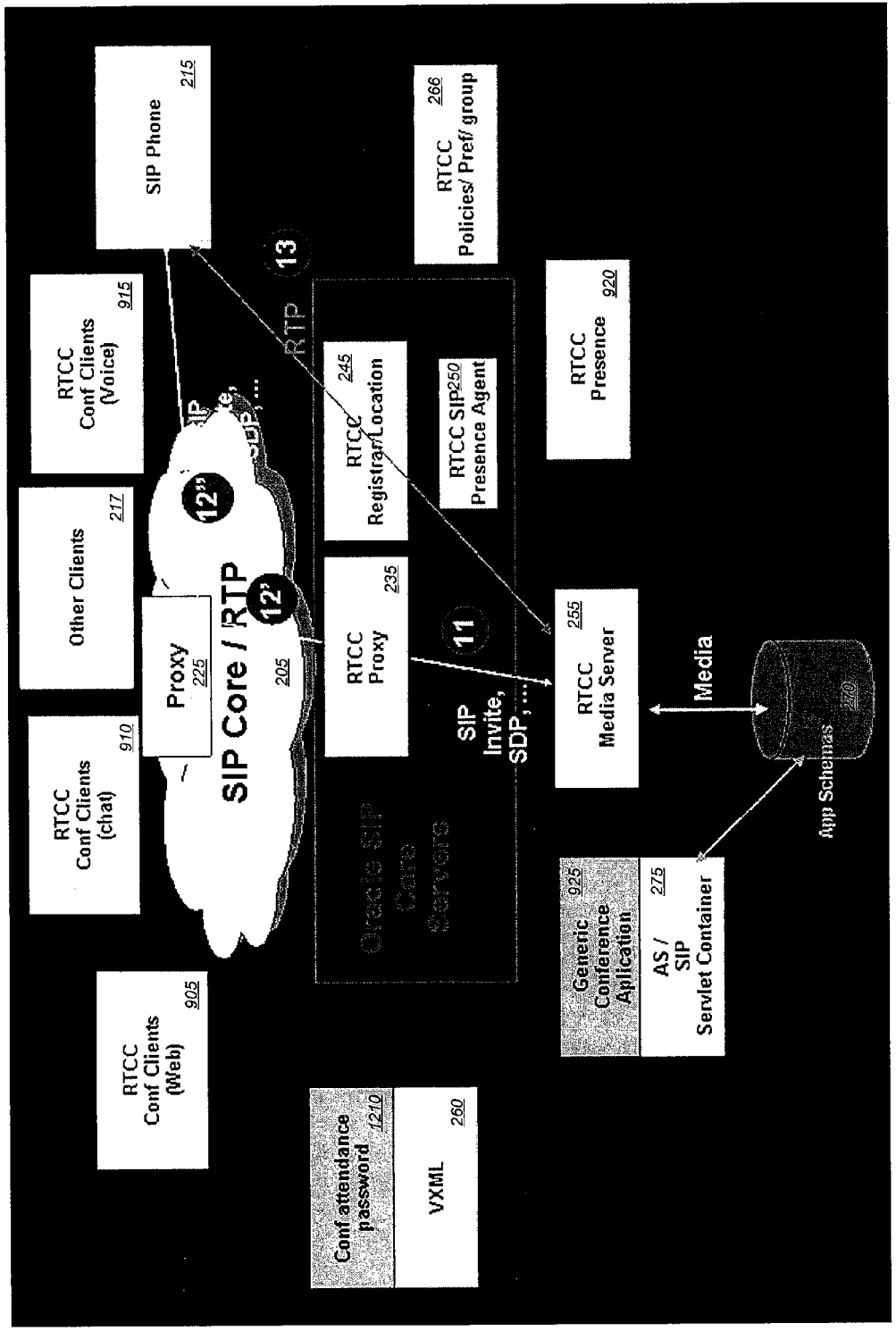

FIGS. 11A and 11B are a block diagrams illustrating adding a VoIP SIP phone to a conference according to one embodiment of the present invention. More specifically, this example illustrates a this example illustrates a SIP based infrastructure for supporting a web conference such as described above and initiation of a web conference from a SIP device such as a SIP phone. According to this embodiment, the SIP client 215 can be adapted to invite, i.e., send a SIP INVITE or other message.

This message can be routed to a VXML server 260, or other server for authentication 1220 of a user of the client 215. During authentication, a hold invite 1215 may be sent to the client 215. Authentication can include the client providing a password to the VXML server 260. Upon authentication, the VXML server 260 or other server may pass an acceptance message and/o the password 1210 to the conference application 925 and/or the media server to allow the client 215 to join the conference.

As illustrated in FIG. 11B, an INVITE or other message can then be send to the media server 255 by the client 215. Upon acceptance of the invitation message by the media server 255, the conference can be initiated and media can be exchanged between the client 215 and the media server 255 and/or any other participants as discussed above.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing a multi-media conference, the method comprising:
   receiving a request to participate in the conference from a first client via a signaling protocol;
   assigning a conference identifier to the conference;
   inviting the first client and a media server adapted to support the conference to join the conference via third-party call control of the signaling protocol, wherein inviting the first client and the media server comprises sending invitation messages of the signaling protocol to each of the first client and the media server wherein the invitation messages include the conference identifier;
   inviting a second client to join the conference via the third-party call control of the signaling protocol; and
   providing floor control of the conference via messages of the signaling protocol, wherein providing floor control comprises:
      receiving a request from the first client to control the conference; and
      in response to the request from the first client, granting control of the conference to the first client, wherein receiving the request from the first client to control the conference comprises receiving a first message via the signaling protocol indicating a request for the floor and granting control of the conference to the first client comprises sending a Session Description Protocol (SDP) update to the second client.

2. The method of claim 1, wherein the signaling protocol comprises Session Initiation Protocol (SIP) and wherein the third-party call control comprises Real Time Call Control (RTCC).

3. The method of claim 2, wherein at least one of the first client and the second client comprises a RTCC web conference client.

4. The method of claim 3, wherein inviting the second client to join the conference is performed in response to a request by the first client to invite the second client.

5. The method of claim 3, wherein inviting the second client to join the conference is performed in response to a request by the second client to join the conference.

6. The method of claim 3, wherein inviting the second client to join the conference is performed in response to a request by the media server to invite the second client.

7. The method of claim 2, wherein sending invitation messages of the signaling protocol to each of the first client and the media server comprises sending SIP INVITE messages to each of the first client and the media server.

8. The method of claim 1, wherein providing floor control comprises performing one or more of muting at least one client, unmuting at least one client, generating another type of media exchange, holding at least one client, and unholding at least one client.

9. The method of claim 1, wherein receiving the request from the client comprises receiving the request via the signaling protocol.

10. The method of claim 1, wherein receiving the request from the client comprises receiving the request via the media of the conference.

11. The method of claim 1, wherein receiving the request from the client comprises receiving the request via the signaling protocol and the media of the conference.

12. The method of claim 1, wherein receiving the request from the first client to control the conference comprises receiving a first message via the signaling protocol indicating an event for requesting the floor and granting control of the conference to the first client comprises sending a second message to the first client and the second client indicating the first client has been granted the floor.

13. The method of claim 12, wherein granting control of the conference to the first client further comprises muting the second client.

14. The method of claim 12, wherein granting control of the conference to the first client further comprises holding the second client.

15. The method of claim 12, wherein granting control of the conference to the first client further comprises initiating a side conference between the first client and the second client.

16. The method of claim 1, wherein receiving the request from the first client to control the conference comprises receiving an indication of a first Dual-Tone Multi-Frequency code corresponding to a request for control of the conference via a first message of the signaling protocol and granting control of the conference to the first client comprises sending a second DTMF code to the second client via a second message of the signaling protocol.

17. The method of claim 1, wherein receiving the request from the first client to control the conference comprises receiving an indication of a first Dual-Tone Multi-Frequency code corresponding to a request for control of the conference via a first message of the media of the conference and granting control of the conference to the first client comprises sending a second DTMF code to the second client via a second message of the media of the conference.

18. The method of claim 1, wherein receiving the request from the first client to control the conference comprises receiving at the media server a first message via the signaling protocol indicating a request for the floor and granting control of the conference to the first client comprises transmitting a packet indicating floor control by the first client as part of Real-time Transport Protocol (RTP) data from the media server.

19. The method of claim 1, further comprising:
receiving a response from the client indicating acceptance of the invitation; and
in response to the response from the client indicating acceptance of the invitation, establishing a session with the client, the session supporting an exchange of data.

20. The method of claim 19, wherein the exchange of data comprises audio data.

21. The method of claim 19, wherein the exchange of data comprises video data.

22. A system for providing a multi-media conference, the system comprising:
a communications network;
a media server communicatively coupled with the communications network and adapted to support the multi-media conference;
a first client communicatively coupled with the communications network and adapted to request participation in the multi-media conference via a signaling protocol;
a second client communicatively coupled with the communications network; and
an application server communicatively coupled with the communications network and adapted to receive the request from the first client and, in response to the request from the first client, assign a conference identifier to the conference and send an invitation message of the signaling protocol to the first client and the media server to initiate the conference, wherein the application server is further adapted to invite the first client and the media server by sending invitation messages of the signaling protocol to each of the first client and the media server wherein the invitation message includes the conference identifier, invite the second client to join the conference via the third-party call control of the signaling protocol, and provide floor control of the conference via messages of the signaling protocol, wherein providing floor control comprises receiving a request from the first client to control the conference and in response to the request from the first client, granting control of the conference to the first client, wherein receiving the request from the first client to control the conference comprises receiving a first message via the signaling protocol indicating a request for the floor and granting control of the conference to the first client comprises sending a Session Description Protocol (SDP) update to the second client.

23. The system of claim 22, wherein the signaling protocol comprises Session Initiation Protocol (SIP) and wherein the third-party call control comprises Real Time Call Control (RTCC).

24. The system of claim 23, wherein at least one of the first client and the second client comprises a RTCC web conference client.

25. The system of claim 24, wherein inviting the second client to join the conference is performed in response to a request by the first client to invite the second client.

26. The system of claim 24, wherein inviting the second client to join the conference is performed in response to a request by the second client to join the conference.

27. The system of claim 24, wherein inviting the second client to join the conference is performed in response to a request by the media server to invite the second client.

28. The system of claim 24, wherein the media server is further adapted to perform floor control of the conference by receiving a request from the first client to control the conference via a first message of the signaling protocol indicating a request for the floor and grant control of the conference to the first client by transmitting a packet indicating floor control by the first client as part of Real-time Transport Protocol (RTP) data.

29. The system of claim 24, wherein the media server is further adapted to receive a request from the first client to control the conference via a first message of the signaling protocol indicating a request for the floor and pass the request from the first client to a conference application.

30. The system of claim 29, wherein the media server passes the request from the first client to the conference application via an API.

31. The system of claim 29, wherein the conference application is adapted to receive the request from the first client and, in response to the request, perform floor control.

32. The system of claim 31, wherein the conference application is adapted to perform floor control by instructing the media server to perform one or more functions related to the second client.

33. The system of claim 32, wherein the one or more functions related to the second client comprises one or more of muting the second client, unmuting the second client, holding the second client, unholding the second client, and generating another type of media exchange with the second client.

34. The system of claim 23, wherein sending invitation messages of the signaling protocol to each of the first client and the media server comprises sending SIP INVITE messages to each of the first client and the media server.

35. The system of claim 22, wherein receiving the request from the first client to control the conference comprises receiving a first message via the signaling protocol indicating an event for requesting the floor and granting control of the conference to the first client comprises sending a second message to the first client and the second client indicating the first client has been granted the floor.

36. The system of claim 22, wherein receiving the request from the first client to control the conference comprises receiving an indication of a first Dual-Tone Multi-Frequency code corresponding to a request for control of the conference via a first message of the signaling protocol and granting control of the conference to the first client comprises sending a second DTMF code to the second client via a second message of the signaling protocol.

37. A machine-readable memory device having stored thereon a series of instruction which, when executed by a processor, cause the processor to provide a multi-media conference by:
receiving a request to participate in the conference from a first client via a signaling protocol;
assigning a conference identifier to the conference;
inviting the first client and a media server adapted to support the conference to join the conference via third-party call control of the signaling protocol, wherein inviting the first client and the media server comprises sending invitation messages of the signaling protocol to each of the first client and the media server wherein the invitation messages include the conference identifier;
inviting a second client to join the conference via the third-party call control of the signaling protocol; and providing floor control of the conference via messages of the signaling protocol, wherein providing floor control comprises:
receiving a request from the first client to control the conference; and
in response to the request from the first client, granting control of the conference to the first client, wherein receiving the request from the first client to control the conference comprises receiving a first message via the signaling protocol indicating a request for the floor and granting control of the conference to the first client comprises sending a Session Description Protocol (SDP) update to the second client.

38. The machine-readable memory device of claim 37, wherein the signaling protocol comprises Session Initiation Protocol (SIP) and wherein the third-party call control comprises Real Time Call Control (RTCC).

39. The machine-readable memory device of claim 38, wherein at least one of the first client and the second client comprises a RTCC web conference client.

40. The machine-readable memory device of claim 39, wherein inviting the second client to join the conference is performed in response to a request by the first client to invite the second client.

41. The machine-readable memory device of claim 39, wherein inviting the second client to join the conference is performed in response to a request by the second client to join the conference.

42. The machine-readable memory device of claim 39, wherein inviting the second client to join the conference is performed in response to a request by the media server to invite the second client.

43. The machine-readable memory device of claim 38, wherein sending invitation messages of the signaling protocol to each of the first client and the media server comprises sending SIP INVITE messages to each of the first client and the media server.

44. The machine-readable memory device of claim 37, wherein receiving the request from the first client to control the conference comprises receiving a first message via the signaling protocol indicating an event for requesting the floor and granting control of the conference to the first client comprises sending a second message to the first client and the second client indicating the first client has been granted the floor.

45. The machine-readable memory device of claim 37, wherein receiving the request from the first client to control the conference comprises receiving an indication of a first Dual-Tone Multi-Frequency code corresponding to a request for control of the conference via a first message of the signaling protocol and granting control of the conference to the first client comprises sending a second DTMF code to the second client via a second message of the signaling protocol.

46. The machine-readable memory device of claim 37, wherein receiving the request from the first client to control the conference comprises receiving at the media server a first message via the signaling protocol indicating a request for the floor and granting control of the conference to the first client comprises transmitting a packet indicating floor control by the first client as part of Real-time Transport Protocol (RTP) data from the media server.

* * * * *

UNITED STATES PATENT AND TRADEMARK OFFICE
CERTIFICATE OF CORRECTION

Page 1 of 2

PATENT NO. : 8,631,069 B2
APPLICATION NO. : 11/680712
DATED : January 14, 2014
INVENTOR(S) : Maes It is certified that error appears in the above-identified patent and that said Letters Patent is hereby corrected as shown below:

In the Drawings

On sheet 9 of 12, in figure 9, under Reference Numeral 925, line 3, delete "Aplication" and insert -- Application --, therefor.

On sheet 10 of 12, in figure 10, under Reference Numeral 925, line 3, delete "Aplication" and insert -- Application --, therefor.

On sheet 11 of 12, in figure 11A, under Reference Numeral 925, line 3, delete "Aplication" and insert -- Application --, therefor.

On sheet 12 of 12, in figure 11B, under Reference Numeral 925, line 3, delete "Aplication" and insert -- Application --, therefor.

In the Specification

In column 1, line 23, delete "and or" and insert -- and/or --, therefor.

In column 3, line 46, delete "processes" and insert -- process --, therefor.

In column 4, line 61, after "network" delete "may".

In column 6, line 1, delete "provided" and insert -- provide --, therefor.

In column 6, line 15, delete "(PTSN)" and insert -- (PSTN) --, therefor.

In column 7, line 41, delete "includes" and insert -- include --, therefor.

Signed and Sealed this
Twenty-ninth Day of July, 2014

Michelle K. Lee
*Deputy Director of the United States Patent and Trademark Office*

CERTIFICATE OF CORRECTION (continued)
U.S. Pat. No. 8,631,069 B2

In column 12, line 23, delete "processes" and insert -- process --, therefor.

In column 16, lines 57-58, after "specifically," delete "this example illustrates a".

In column 17, line 3, delete "and/o" and insert -- and/or --, therefor.